April 21, 1931.  C. A. NELSON  1,801,819
TRIPLE VALVE DEVICE
Filed June 12, 1929
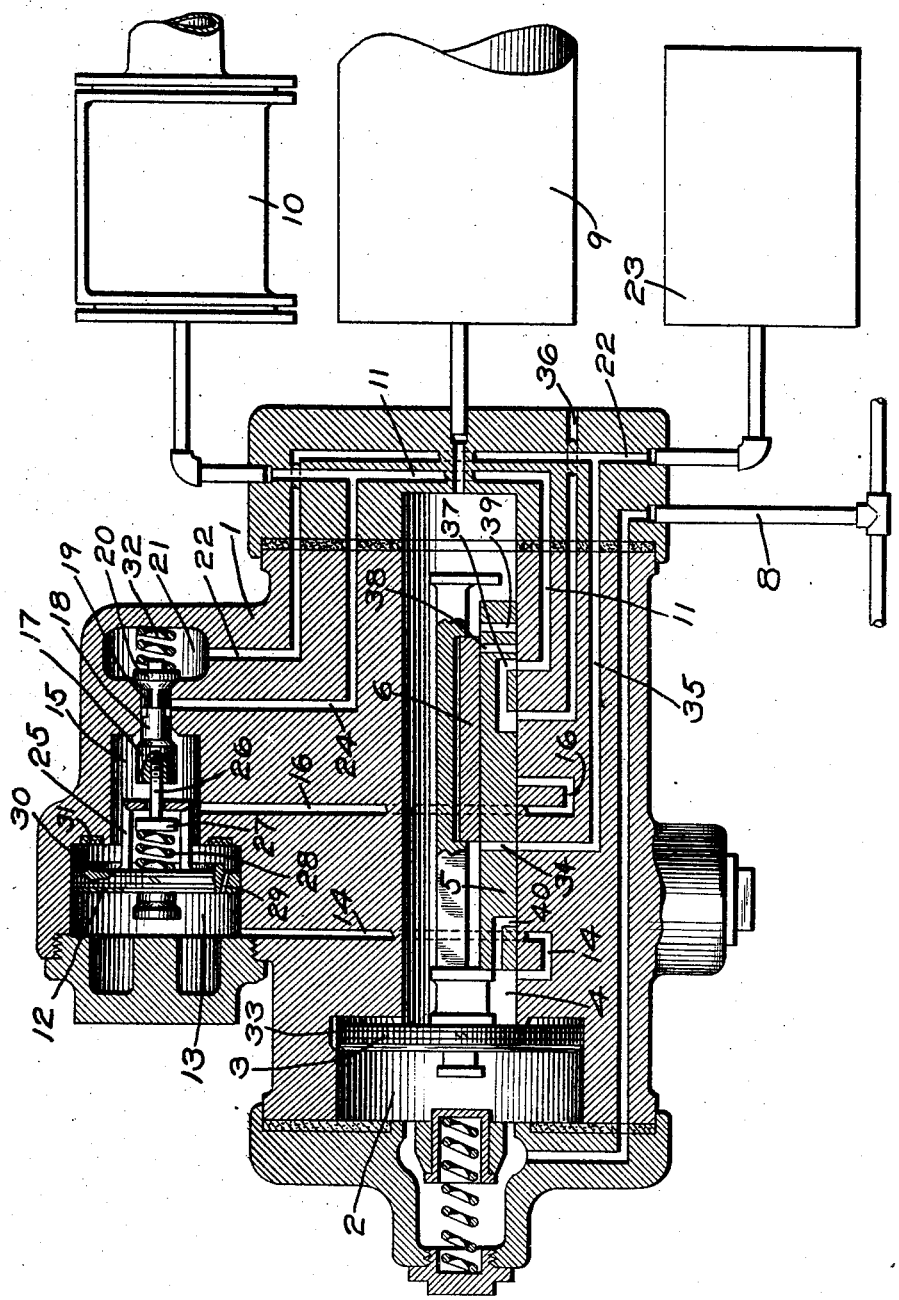
INVENTOR
CLAUDE A. NELSON
BY *Wm. M. Cady*
ATTORNEY Patented Apr. 21, 1931

1,801,819

UNITED STATES PATENT OFFICE

CLAUDE A. NELSON, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

TRIPLE-VALVE DEVICE

Application filed June 12, 1929. Serial No. 370,270.

This invention relates to fluid pressure brakes, and more particularly to means for securing a high brake cylinder pressure in an emergency application of the brakes.

The principal object of my invention is to provide improved means for securing a high brake cylinder pressure in an emergency application of the brakes, in which the high pressure may be obtained after one or more service applications of the brakes.

In the accompanying drawing, the single figure is a diagrammatic view, partly in section, of a fluid pressure brake equipment embodying my invention.

As shown in the drawing, the equipment may comprise a triple valve device having a casing 1 provided with a piston chamber 2, containing a piston 3 and having a valve chamber 4 containing a main slide valve 5 and a graduating valve 6 adapted to be operated by piston 3.

The piston chamber 2 is connected to the usual brake pipe 8 and the valve chamber 4 is connected to the usual auxiliary reservoir 9. The usual brake cylinder 10 is connected to a passage 11, leading to the seat of slide valve 5.

In the casing 1 is mounted an emergency high pressure valve device, comprising a piston 12 having piston chamber 13 at one side connected to a passage 14, which leads to the seat of slide valve 5. The chamber 15 at the opposite side of the piston 12 is connected to a passage 16, leading to the seat of slide valve 5 and said chamber contains a poppet valve 17 provided with a stem 18 which is adapted to engage the end of a stem 19, carried by a poppet valve 20, contained in valve chamber 21.

The valve chamber 21 is connected by a passage 22 to a supplemental reservoir 23 and valve 20 controls communication from valve chamber 21 to a passage 24 which leads to passage 11 and therefore communicates with the brake cylinder 10.

The piston 12 carries a cage 25 and extending through an opening in the end wall of the cage 25 is a stem 26 having screw-threaded connection with the valve 17, and carried at the end of the stem 26 is a head 27 which engages the end of a coil spring 28, contained within the cage 25.

The piston 12 has an equalizing port 29 for permitting the equalization of fluid pressures on opposite sides of the piston and said piston is provided with a seat rib 30 adapted to engage a seat 31, when the piston 12 is shifted to the right. A spring 32 urges the valve 20 to its seat and tends to hold the piston 12 in the position shown.

In operation, with the brake pipe 8 charged with fluid under pressure, fluid flows to piston chamber 2 of the triple valve device, and with piston 3 in release position, as shown in the drawing, fluid flows through the usual feed groove 33 to valve chamber 4, and thence to the auxiliary reservoir 9. The supplemental reservoir 23 is charged with fluid under pressure from the valve chamber 4, through port 34 in the slide valve 5 and passages 35 and 22. The valve chamber 21 being connected through passage 22 with the supplemental reservoir is also charged with fluid from the supplemental reservoir.

In release position, the brake cylinder passage 11 is connected to exhaust passage 36, through cavity 37 in slide valve 5, so that the brakes are released.

Upon a gradual reduction in brake pipe pressure, the piston 3 is shifted toward the left, first moving the graduating valve 6 so as to close the port 31 and uncover the service port 38. The main slide valve 5 is then moved until the service port 38 registers with passage 11, and then fluid under pressure is supplied from the valve chamber 4 and the auxiliary reservoir 9 to the brake cylinder 10 to effect a service application of the brakes in the usual manner.

When the auxiliary reservoir pressure has been reduced by flow to the brake cylinder, to a degree slightly less than the reduced brake pipe pressure, the piston 3 is shifted toward the right, so that the graduating valve 6 is operated to lap the port 38, in the usual manner.

The brakes may be released by increasing the brake pipe pressure, so that the piston 3 is shifted to release position, in which the feed groove 33 is uncovered, so that fluid is supplied from the brake pipe to recharge the auxiliary reservoir and the brake cylinder is connected to the exhaust passage 36.

Upon a sudden reduction in brake pipe pressure, the piston 3 is shifted to the extreme left and the main slide valve 5 is shifted so that emergency port 39 registers with passage 11 and fluid then flows from the auxiliary reservoir to the brake cylinder. In emergency position, the passage 14 is connected to the valve chamber 4 through port 40 in slide valve 5, so that, as in release position, the piston chamber 13 of the high pressure emergency valve device is maintained charged with fluid under pressure.

In emergency position, cavity 37 in slide valve 5 connects passage 16 with passage 36, so that fluid is vented from chamber 15 to the atmosphere, said chamber having been supplied with fluid under pressure in release position of the triple valve device from piston chamber 13, through the equalizing port 29.

The venting of fluid from chamber 15, at a faster rate than fluid can flow through the restricted port 29, causes the higher pressure in chamber 13 to shift piston 12, so that the seat ring 30 engages the seat 31. This movement of the piston causes the valve 20 to be unseated, so that fluid under pressure is supplied from the supplemental reservoir 23 to the brake cylinder 10 by the pressure of spring 28 acting through the head 27, and at the same time, the valve 17 is shifted to its seat, so that communication from chamber 15 to the brake cylinder passage 24 is cut off.

By this means, loss of fluid pressure by flow from the brake cylinder to chamber 15 is prevented, the chamber 15 being connected to the atmospheric exhaust passage 36 in emergency position of slide valve 5.

The spring 28 provides a yielding connection between the valve 17 and the piston 12, so that the valve 17 may seat and at the same time, will not prevent the seating of the seat rib 30 of the piston 12 on the seat 31. It is desirable to provide a seal between the chamber 13 and the chamber 15 when the parts are in emergency position, so as to prevent loss of fluid from the auxiliary reservoir by flow past the piston 12 to chamber 15.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, brake cylinder and a supplemental reservoir, of a valve for controlling the supply of fluid from said reservoir to the brake cylinder, a piston normally subject on opposite sides to fluid under pressure and operated upon venting fluid from one side to actuate said valve, means operative upon movement of said piston for cutting off communication from one side of the piston to the other, a valve operated by said piston for cutting off communication from the vented side of said piston to the brake cylinder, means permitting movement of said piston relative to the last mentioned valve, and means operated upon a reduction in brake pipe pressure for venting fluid from one side of said piston.

2. In a fluid pressure brake, the combination with a brake pipe, brake cylinder and a supplemental reservoir, of a valve for controlling the supply of fluid from said reservoir to the brake cylinder, a piston normally subject on opposite sides to fluid under pressure and operated upon venting fluid from one side to actuate said valve, a seat ring carried by said piston for cutting off communication from the fluid pressure side of said piston to the vented side upon movement of said piston, a valve operated by said piston for cutting off communication from the vented side of said piston to the brake cylinder, a yielding connection between the last mentioned valve and said piston to permit the seat ring to seat by a relative movement of the piston after said valve has seated, and means operated upon a reduction in brake pipe pressure for venting fluid from said piston.

3. In a fluid pressure brake, the combination with a brake pipe, brake cylinder, and a supplemental reservoir, of double beat valves, one of which controls the supply of fluid under pressure from the supplemental reservoir to the brake cylinder, a piston normally subject on opposite sides to fluid pressure and operated by venting fluid from one side for operating said valves, the other of said double beat valves operating to cut off communication from the vented side of said piston to the brake cylinder, and means operated upon a reduction in brake pipe pressure for venting fluid from said piston.

4. In a fluid pressure brake, the combination with a brake pipe, brake cylinder, and a supplemental reservoir, of double beat valves, one of which controls the supply of fluid under pressure from the supplemental reservoir to the brake cylinder, a piston normally subject on opposite sides to fluid pressure and operated by venting fluid from one side for operating said valves, the other of said double beat valves operating to cut off communication from the vented side of said piston to the brake cylinder, a seat ring carried by said piston for cutting off communication from the fluid pressure side of said piston to the vented side, upon movement of said piston, and means permitting a movement of said piston to seat the seat ring after the valve has seated which operates to cut off communication from the vented side of said piston to the brake cylinder, and means operated upon a reduction in brake pipe pressure for venting fluid from one side of said piston.

In testimony whereof I have hereunto set my hand, this 10th day of June, 1929.

CLAUDE A. NELSON.